(12) United States Patent
Kiyama et al.

(10) Patent No.: US 6,423,121 B1
(45) Date of Patent: Jul. 23, 2002

(54) NITROGEN ADSORBENT AND USE THEREOF

(75) Inventors: Hiromi Kiyama; Haruo Yoshioka; Hisanao Jo; Jin-Bae Kim, all of Sakai (JP)

(73) Assignee: Daido Hoxan Inc., Sapporo (JP)

( * ) Notice: Subject to any disclaimer, the term of this patent is extended or adjusted under 35 U.S.C. 154(b) by 0 days.

(21) Appl. No.: 09/508,764

(22) PCT Filed: Jul. 16, 1998

(86) PCT No.: PCT/JP98/03207

§ 371 (c)(1),
(2), (4) Date: Jun. 14, 2000

(87) PCT Pub. No.: WO00/03799

PCT Pub. Date: Jan. 27, 2000

(51) Int. Cl.$^7$ ............................................. B01D 53/04
(52) U.S. Cl. .............................. 95/130; 95/96; 95/902; 502/79
(58) Field of Search ...................... 95/130, 902, 95–106

(56) References Cited

U.S. PATENT DOCUMENTS

| | | | | |
|---|---|---|---|---|
| 3,140,931 A | * | 7/1964 | McRobbie | 95/902 X |
| 3,140,932 A | * | 7/1964 | McKee | 95/130 |
| 3,140,933 A | * | 7/1964 | McKee | 95/130 |
| 4,544,378 A | * | 10/1985 | Coe et al. | 95/902 X |
| 4,859,217 A | * | 8/1989 | Chao | 95/902 X |
| 5,074,892 A | | 12/1991 | Kohn et al. | 55/16 |
| 5,152,813 A | | 10/1992 | Coe et al. | 55/26 |
| 5,258,058 A | * | 11/1993 | Coe et al. | 95/130 X |
| 5,268,023 A | | 12/1993 | Kirner | 95/103 |
| 5,464,467 A | * | 11/1995 | Fitch et al. | 95/130 X |
| 5,962,358 A | | 10/1999 | Hees et al. | 502/67 |
| 6,036,939 A | * | 3/2000 | Funakoshi et al. | 95/130 X |
| 6,053,966 A | * | 4/2000 | Moreau et al. | 95/130 X |
| 6,143,057 A | * | 11/2000 | Bulow et al. | 95/130 X |
| 6,171,370 B1 | * | 1/2001 | Hirano et al. | 95/130 X |

FOREIGN PATENT DOCUMENTS

| | | |
|---|---|---|
| JP | 6-198118 | 7/1994 |
| JP | 8-40719 | 2/1996 |
| JP | 10-53410 | 2/1998 |
| JP | 10-118485 | 5/1998 |

OTHER PUBLICATIONS

International Search Report dated Sep. 16, 1998.

* cited by examiner

*Primary Examiner*—Robert H. Spitzer
(74) *Attorney, Agent, or Firm*—Armstrong, Westerman & Hattori, LLP

(57) ABSTRACT

A nitrogen adsorbent comprising a crystalline X zeolite having a faujasite structure with an $SiO_2/Al_2O_3$ ratio of less than 3.0, wherein the crystal contains at least one trivalent element of the group consisting of Fe, B and Ga and $(AlO_4)^{5-}$ tetrahedral units thereof associated with cations. Although the adsorbent contains a designated trivalent element in the zeolite, it maintains the number of cation sites contributing to adsorption, has an excellent separation performance of nitrogen and oxygen, and exhibits excellent heat resistance. Further, when the nitrogen adsorbent of the present invention is used in such a particular manner that it adsorbs nitrogen after being heated under a vacuum, adsorption performance is improved.

4 Claims, No Drawings

NITROGEN ADSORBENT AND USE THEREOF

TECHNICAL FIELD

The present invention relates to a nitrogen adsorbent which selectively adsorbs nitrogen from a nitrogen-containing gas such as air, and a method of using the same.

BACKGROUND ARTS

A pressure swing adsorption method (PSA method) is one of methods for selective adsorption and separation of nitrogen from a nitrogen-containing gas. This PSA method uses a nitrogen adsorbent such as a zeolite, to obtain oxygen by adsorbing and separating nitrogen from air, for example. The PSA method is conducted by repeating a cyclic pressure change, in other words selectively adsorbing nitrogen by use of a nitrogen adsorbent under a high pressure and then returning to a low pressure to thereby release nitrogen from the nitrogen adsorbent and to regenerate the nitrogen adsorbent.

The zeolite used in the PSA method has cations associated in a crystal thereof and the cations exert an electrostatic attraction on a gas molecule (nitrogen) to be adsorbed. Thus, the zeolite has a property to adsorb more highly polar molecules. By using these properties and changing the cations associated therewith, zeolites with a good adsorption performance have been found. U.S. Pat. No. 3,140,932, for example, discloses an X-zeolite having one cation of Ba, Sr and Ni and exhibiting excellent nitrogen adsorption. U.S. Pat. No. 3,140,933 also discloses a technique concerning nitrogen adsorption which uses a zeolite having an apparent pore size of not less than 4 Å and containing $Li^+$ as a cation. Further, TOKKOHEI (Japanese published examined patent application) 5-25527 discloses a technique concerning nitrogen adsorption which uses a zeolite having an $SiO_2/Al_2O_3$ ratio of from 2.0 to 2.5 and not less than 88% of $Li^+$ cations associated. In TOKKOHEI 7-57300, a zeolite is disclosed which has an improved adsorption performance by mixing divalent cations in addition to a Li cation.

However, the aforementioned conventional zeolites require an extremely high association ratio of cations such as $Li^+$ in order to ensure a high adsorption performance.

Therefore, the zeolites require many cations such as $Li^+$ for ion-exchange, causing a problem of a high production cost. Further, an X-zeolite has an extremely high affinity with water and once it adsorbs, even a very small amount of adsorbed water remarkably deteriorates its performance, so that activation by dehydration is required. Such activation generally needs a high temperature of not less than 400° C. Thus, zeolites inferior in heat resistance such as an Al-rich zeolite and a zeolite having an $Li^+$ cation of a high charge density, are difficult to handle in activation, and in the worst case their performances are deteriorated.

In view of the foregoing, it is an object of the present invention to provide a nitrogen adsorbent exhibiting an improved heat-resistance and an improved nitrogen separation factor with a less production cost and a method of using it.

DISCLOSURE OF THE INVENTION

In accordance with an aspect of the present invention in achieving the aforementioned object, provided is a nitrogen adsorbent comprising a crystalline X-zeolite having a faujasite structure with an $SiO_2/Al_2O_3$ ratio of less than 3.0, wherein the crystal contains at least one trivalent element of the group consisting of Fe, B and Ga and has $(AlO_4)^{5-}$ tetrahedral units thereof associated with cations.

Further, in accordance with another aspect of the present invention, provided is a method of using a nitrogen adsorbent wherein the nitrogen adsorbent as described above adsorbs nitrogen after being heated under a vacuum.

The nitrogen-selective adsorption performance of a zeolite has the property of adsorbing more highly polar molecules since the cations associated in a zeolite crystal, as mentioned above, exert an electrostatic attraction on a gas molecule (nitrogen) to be adsorbed. Particularly, the X-zeolite is one kind of zeolite having large pores and the smallest $SiO_2/AlO_2O_3$ ratio. Thus, the X-zeolite has an appropriate space to adsorb gas molecules and a large number of cation sites.

The inventors of the present invention have found that the X-zeolite containing at least one trivalent element selected from the group consisting of Fe, B and Ga, and $(AlO_4)^{5-}$ tetrahedral units associated with cations in the crystal thereof, has a larger number of cation sites contributing to adsorption and a high nitrogen adsorption performance, such as nitrogen-oxygen separation performance. In addition, the zeolite containing at least one trivalent element selected from the group consisting of Fe, B and Ga may have improved heat-resistance. Particularly, the zeolite containing Fe as the trivalent element adsorbs, in terms of adsorption amount of nitrogen and oxygen, much less oxygen than nitrogen. With such a property, during nitrogen-oxygen separation in a PSA method, it is found that an excellent separation performance is exhibited and the oxygen generation ratio becomes extremely high. Further, although some materials have an excellent performance only in nitrogen adsorption, the nitrogen adsorbent of the present invention has an excellent separation factor, and so far there is no other material exhibiting such an excellent performance. Thus, with the zeolite having a high separation factor, the efficiency unit in a PSA method (amount of electricity per one unit of oxygen generation volume) can remarkably be improved and thus oxygen can be generated by less energy in comparison with a conventional one.

In accordance with the present invention, when Li is used as a cation, an excellent nitrogen adsorption performance is exhibited. In other words, among the cations contributing to adsorption, $Li^+$ has an ion radius of 0.60 Å, which is the smallest among alkali metals. Therefore, $Li^+$ has the highest charge density among monovalent cations and a strong interaction with a polar substance to thereby attract cations and to create an electrostatic field by its bonding balance. Such an electrostatic field attracts and selectively adsorbs molecules with quadrupole moment such as nitrogen, resulting in the zeolite exhibiting an excellent nitrogen adsorption performance.

Moreover, the inventors have found that when the nitrogen adsorbent of the present invention has not less than 60% to less than 88% of its $(AlO_4)^{5-}$ tetrahedral units associated with $Li^+$ cations, an excellent adsorption performance is exhibited. Accordingly, the nitrogen adsorbent of the present invention can obtain the excellent adsorption performance even at a relatively lower cation association ratio, thereby decreasing production costs.

Furthermore, the inventors have found that adsorption performance is improved by heating the adsorbent as described above under a vacuum and then adsorbing nitrogen. It has been found that a relatively high temperature, which is not less than 400° C. to not greater than 600° C., is suitable for heating under a vacuum.

BEST MODE FOR CARRYING OUT THE INVENTION

Embodiments of the present invention will next be described in detail.

The nitrogen adsorbent of the present invention selectively adsorbs and thereby separates nitrogen from a nitrogen-containing gas. The nitrogen-containing gas intended is typically air. In this case, nitrogen is adsorbed and separated from air for generating oxygen. The adsorbent also may be used for separating nitrogen from gas mixtures of nitrogen with oxygen, argon, helium, neon, hydrogen and the like as well as from air.

The nitrogen adsorbent of the present invention comprises a crystalline X zeolite. The X zeolite has a faujasite structure which has an $SiO_2/Al_2O_3$ ratio of less than 3.0. The upper limit for the $SiO_2/Al_2O_3$ ratio is preferably not greater than 2.5, more preferably 2.0.

The nitrogen adsorbent has at least one trivalent element of the group consisting of Fe, B and Ga in the crystal thereof. It is considered that, due to the presence of these trivalent elements in the crystal, the adsorbent exhibits a high separation performance in obtaining oxygen by adsorbing and separating nitrogen from air, and exhibits enhanced heat resistance. It is also considered that these trivalent elements in the crystal, for reason described hereinafter, may not be present in the form of an oxide or a cation, but may be present in a framework of the crystal. In other words, it is thought that a part of the $(AlO_4)^{5-}$ tetrahedron of the X zeolite is replaced by at least one trivalent element selected from the group consisting of Fe, B and Ga, the number of cation sites contributing to adsorption is maintained, and therefore the adsorbent shows a high separation performance. In addition, because the $(AlO_4)^{5-}$ tetrahedron is replaced by the trivalent elements, the Al component is decreased, which thereby enhances heat resistance.

Among the above mentioned trivalent elements, Fe is particularly suitable. When the crystal has Fe therein, an amount of adsorbed oxygen becomes much smaller than an amount of adsorbed nitrogen during the adsorption and separation of nitrogen from air. Thus, the separation factor is excellent in obtaining oxygen by a PSA method, resulting in a considerably high oxygen generation ratio. The separation factor ($N_2/O_2$) is represented by the following formula (1).

$$(N_2/O_2)=(N_{N2}/Y_{N2})/(N_2O/Y_2O) \qquad (1)$$

$N_{N2}$: amount of adsorbed $N_2$ under a partial pressure (608 Torr) of nitrogen in air $Y_{N2}$: molar fraction of nitrogen in air (0.8)

$N_2O$: amount of adsorbed $O_2$ under a partial pressure (152 Torr) of oxygen in air $Y_2O$: molar fraction of oxygen in air (0.2)

The nitrogen adsorbent of the present invention has a cation associated with the $(AlO_4)^{5-}$ tetrahedral unit thereof. The cation is in a position near $(AlO_4)^{5-}$ with an excessive negative charge for neutralizing it and associating therewith in the crystal. The cation exerts an electrostatic attraction on a gas molecule to be adsorbed and thereby adsorbs a number of nitrogen molecules more polar than oxygen.

The cation is not particularly limited, examples thereof include as a monovalent cation $Li^+$, $Na^+$, $K^+$, $Rb^+$, and $Cs^+$, as a divalent cation $Mg^{2+}$, $Ca^{2+}$, $Sr^{2+}$, and $Ba^{2+}$, and as a trivalent cation lanthanoids such as $La^{3+}$ and $Ce^{3+}$, and $Sc^{3+}$, $Y^{3+}$, $B^{3+}$, $Al^{3+}$, and $Ga^{3+}$. Among these, $Li^+$ is particularly suitable. $Li^+$ has an ion radius of 0.60 Å, the smallest among alkali metals. Therefore, $Li^+$ has a high charge density and a strong interaction with a polar substance to thereby attract cations and to create an electrostatic field by its bonding balance. Such electrostatic field attracts and selectively adsorbs a molecule with a polar moment such as nitrogen. A divalent cation such as $Ca^{2+}$ has a higher charge density and adsorbs more polar molecules such as nitrogen than $Li^+$, but it also adsorbs more oxygen in comparison with $Li^+$, thereby decreasing a separation factor ($N_2/O_2$).

$Li^+$ ion-exchanged X zeolite, as mentioned above, promotes adsorption of nitrogen molecules by a $Li^+$ ion associated with $(AlO_4)^{5-}$ tetrahedral unit, and thus in general with a higher association ratio of the $Li^+$ ion, the zeolite exhibits a good adsorption performance. It is preferred that not less than 88% of $(AlO_4)^{5-}$ tetrahedral unit is associated therewith. However, according to the present invention, the nitrogen adsorbent can exhibit good adsorption performance even when $Li^+$ ions are associated with not less than 60% to less than 88% of the $(AlO_4)^{5-}$ tetrahedral unit. Conventionally, the amount of $Li^+$ ions used is large for a higher association ratio of $Li^+$ ions, but in accordance with the present invention, a relatively low association ratio of $Li^+$ ions still allows good adsorption performance, thereby reducing production costs.

The nitrogen adsorbent of the present invention may, for example, be produced by the following process.

First, sodium silicate and sodium aluminate as starting materials are adjusted with sodium hydroxide, potassium hydroxide and the like to have an $SiO_2/Al_2O_3$ ratio of less than 3.0 and the formulation mentioned below. To the adjusted solution are added boron oxide, sodium tetraborate and the like as B source, gallium oxide, gallium nitrate and the like as Ga source, and iron nitrate, iron chloride and the like as Fe source. The adjusted solution, after adding a seed crystal thereto, is heated at a temperature of 40 to 100° C. for 24 to 120 hours for aging. The resultant solution is next heated and maintained at a temperature of 60 to 100° C. for crystallization. Consequently, a nitrogen adsorbent comprising X-zeolite containing Fe is obtained. In the aforementioned condition, the nitrogen adsorbent comprises Na and/or K-type X-zeolite having $Na^+$ and $K^+$ as a cation associated with $(AlO_4)^{5-}$ tetrahedral unit of the X zeolite.

Composition $SiO_2/(Al_2O_3+Fe_2O_3)=1.6{\sim}3.0$ $Fe_2O_3/(Al_2O_3+Fe_2O_3)=0{\sim}0.3$ $(Na_2O+K_2O)/(Al_2O_3+Fe_2O_3)=5.0{\sim}10.0$ $K_2O/(Na_2O+K_2O)=0{\sim}0.5$ $H_2O/SiO_2=40{\sim}80$ Further, in the case of obtaining a nitrogen adsorbent comprising Li type X-zeolite with $Li^+$ as the associated cation, the Na and/or K-type X-zeolite is subjected to ion exchange treatment for ion-exchanging $Na^+$ and $K^+$ with $Li^+$ and consequently. $Li^+$ is the associated cation with the $(AlO_4)^{5-}$ tetrahedral unit.

Generally, a nitrogen adsorbent, before its use, is activated at about 400° C. to remove adsorbed water molecules to not greater than about 1% by weight. The nitrogen adsorbent of the present invention, before its use, is heated under a reduced pressure at 400 to 600° C. for several hours, and therefore the adsorbent exhibits an improved adsorption performance than one which is activated only by removing adsorbed water molecules. The reason for the above has not as yet been made clear. The above property has not been seen in a conventional X-zeolite without Fe and the like, and thus the presence of Fe and the like in the crystal may be a reason.

The present invention will hereinafter be explained by way of Examples thereof.

EXAMPLES

A variety of Fe-containing X-zeolites were each prepared. First, sodium aluminate was dissolved with stirring and heated in sodium hydroxide and potassium hydroxide solutions until the resultant solution became transparent, so that the solution had the formulation shown in Table 1 below. Subsequently, it was cooled to room temperature. On the other hand, iron (III) nitrate was dissolved in pure water to form an iron nitrate solution. Then, pure water was added to a sodium silicate solution so that each resultant had the formulation in Table 1 below, and then it was stirred at 200 to 10,000 rpm, slowly adding sodium aluminate solution prepared above thereto. Next, the iron nitrate solution was added thereto, thereby obtaining an amorphous gel having the formulation mentioned before. The temperature of the reaction solution for generating this gel was increased to about 50° C.

TABLE 1

| Formulation ratio | Samples | | | | | |
|---|---|---|---|---|---|---|
| | 1 | 2 | 3 | 4 | 5 | 6 |
| $SiO_2/(Al_2O_3 + Fe_2O_3)$ | 1.82 | 1.82 | 1.80 | 1.80 | 1.82 | 1.82 |
| $Fe_2O_3/(Al_2O_3 + Fe_2O_3)$ | 0.02 | 0.05 | 0.10 | 0.10 | 0.20 | 0.20 |
| $(Na_2O + K_2O)/(Al_2O_3 + Fe_2O_3)$ | 6.25 | 6.36 | 6.30 | 6.30 | 6.36 | 6.64 |
| $K_2O/(Na_2O + K_2O)$ | 0.29 | 0.29 | 0.29 | 0.29 | 0.29 | 0.33 |
| $H_2O/SiO_2$ | 65 | 65 | 65 | 65 | 65 | 65 |
| $SiO_2/Al_2O_3$ | 1.86 | 1.88 | 2.00 | 2.00 | 2.27 | 2.27 |

Next, for the purpose of rapidly and homogeneously generating a crystal, a seed crystal was added in the prepared gel. The seed crystal was synthesized by a conventional method, that is, by use of a low silica X-zeolite (hereinafter abbreviated as "LSX") having a surface area of 700 m$^2$/g and an $SiO_2/Al_2O_3$ ratio of 2.0. Based on the weight of the gel, about 0.1 to 0.5% by weight of this seed crystal was added. The obtained gel was put in a fluorine plastic container. Then, the fluorine plastic container was placed in a constant temperature bath set at a predetermined aging temperature (40 or 60° C.) and left at rest for 24 to 120 hours for aging. After aging, the gel was left at rest at a temperature of not less than 60 to not greater than 100° C. for 0 to 24 hours for crystallization. The resultant product was filtered and cleaned sufficiently by use of an ion-exchange water until the pH of the cleaning water used therefor became not greater than 10. Then, the product was dried in a dryer at 100° C. overnight, thereby obtaining Na·K-type Fe-containing low silica X-zeolite (LSX). The synthesizing conditions for the above are described in the following Table 2.

TABLE 2

| Synthesizing conditions | Samples | | | | | |
|---|---|---|---|---|---|---|
| | 1 | 2 | 3 | 4 | 5 | 6 |
| Aging temp. (° C.) | 40 | 40 | 40 | 40 | 40 | 40 |
| Aging period (hrs.) | 90 | 114 | 110 | 112 | 120 | 120 |
| Crystallization temp. (° C.) | — | 100 | — | 100 | 100 | — |
| Crystallization period (hrs.) | — | 2 | — | 2 | 2 | — |

The effects of the synthesizing conditions and the basic physical properties of the obtained LSXs are described hereinafter. The obtained crystal samples were each analyzed by X-ray diffraction and confirmed as having a faujasite structure. Then, by measuring the surface area, each sample was evaluated with respect to crystallinity. In Table 3 below, the percentage of Fe content and the surface area of each sample are shown. The Fe-containing LSX samples in Table 3 contain Na ions and K ions which were added during synthesis and vary a little in a surface area per weight due to the ratio of Na ions to K ions. However, samples having an Fe content [Fe/(Fe+Al)×100] of up to 10% demonstrated good crystallinity, having a surface area of about not less than 700 m$^2$/g. When the Fe content was increased to 20%, crystallinity was a little degraded and the surface area was decreased by about 10%.

TABLE 3

| Synthesizing conditions | Samples | | | | | |
|---|---|---|---|---|---|---|
| | 1 | 2 | 3 | 4 | 5 | 6 |
| Fe content (%) | 2 | 5 | 10 | 10 | 20 | 20 |
| Surface area (m$^2$/g) | 724 | 729 | 702 | 685 | 591 | 639 |

An increase of the amount of Fe component added caused the optimum synthesizing conditions to be changed, and as more Fe component is added, more alkali such as sodium hydroxide and potassium hydroxide are desired to be added. As more alkali are added, in addition to a crystal having a faujasite structure, A-type or unknown crystalline products are liable to be produced. In order to produce a crystal having a pure faujasite structure, it is necessary to hold a relatively low temperature of not greater than 40° C. for a long period for aging. For example, when a LSX containing 20% of Fe component was synthesized with the same amount of alkali ($Na_2O/SiO_2$=2.44, $K_2O/SiO_2$=0.81) as used for a LSX containing no Fe, it was observed that the peak strength of X-ray diffraction and the surface area were reduced to about not greater than half and that crystal formation was insufficient. However, even in a 20% Fe-containing LSX, if the amount of alkali to be added was increased by about 10% and the temperature was kept at 40° C. for not less than 80 hours for aging, crystal formation was sufficient and the surface area was increased to not less than 600 m$^2$/g.

The addition of the seed crystal to a reaction solution exhibits, as already known in synthesis of an A-type zeolite, effects such as reduction in synthesis period, decrease in synthesis temperature, and shift to finer crystal particles. In the case of synthesizing the Fe-containing LSX of the present invention, the same effects were confirmed.

Influences on crystal format ion caused by the stirring speed for stirring and mixing a raw material solution were reviewed. When the solution was vigorously stirred by use of a homogenizer at a speed of 2,000 to 10,000 rpm, more homogeneous and finer particles were likely to be formed. When the stirring speed was low, crystal formation was not homogeneous due to the presence of iron oxide particles mixed with the product. However, stirring vigorously by use of a homogenizer homogeneously disperses the Fe component as iron hydroxide in the gel. Further, when stirring vigorously by use of a homogenizer, a few percentage of increase of alkali amount to be added improved crystallinity of the product.

The composition of the nitrogen adsorbent of the Examples were each analyzed.

The following Table 4 shows bulk composition ratios and surface composition ratios of respective elements in Examples, based on Si being unity (represented as 1). The bulk composition ratios for Si, Al and Fe were measured by emission spectral analysis by use of an inductively coupled plasma (ICP), the bulk composition ratios for Na and K were measured by atomic absorption analysis (AA), and the surface composition ratios were measured by X-ray photoelectron spectroscopy (XPS).

TABLE 4

|  |  | Samples | | | | | |
| --- | --- | --- | --- | --- | --- | --- | --- |
|  |  | 1 | 2 | 3 | 4 | 5 | 6 |
| Fe content (%) |  | 2 | 5 | 10 | 10 | 20 | 20 |
| Bulk | Si | 1.000 | 1.000 | 1.000 | 1.000 | 1.000 | 1.000 |
| composition | Al | 1.047 | 1.041 | 1.055 | 1.008 | 0.980 | 1.033 |
| (ICP, AA) | Na | 0.671 | 0.781 | 0.874 | 0.758 | 0.763 | 0.810 |
|  | K | 0.316 | 0.335 | 0.361 | 0.318 | 0.266 | 0.359 |
|  | Fe | 0.022 | 0.055 | 0.124 | 0.106 | 0.247 | 0.253 |
| Surface | Si | 1.000 | 1.000 | 1.000 | 1.000 | 1.000 | 1.000 |
| composition | Al | 0.894 | 0.911 | 0.915 | 0.901 | 0.863 | 0.870 |
| (XPS) | Na | 0.503 | 0.715 | 0.677 | 0.625 | 0.636 | 0.667 |
|  | K | 0.216 | 0.261 | 0.207 | 0.252 | 0.206 | 0.214 |
|  | Fe | 0.080 | 0.119 | 0.185 | 0.304 | 0.361 | 0.297 |

It was confirmed according to results of bulk composition analysis that the ratio of Al to Fe showed Fe was contained to the same degree of an initially-formulated Fe content ratio. According to the surface composition (a composition of the portion about several to 20 Å deep from the surface) measured by XPS, the Fe surface concentration increases up to about four times in comparison with the Fe bulk concentration. This means more Fe component exists near the surface. However, considering that the synthesized LSX has a particle diameter of about 1 μm, the composition ratio, measured by XPS, derived from the only surface area is extremely small. Therefore, it is thought that the actual internal Fe concentration is not so much different from that measured as the bulk composition and there may be less than 5% difference therebetween. Provided that a large particle of iron oxide exists on the surface area, it should be observed by a scanning electron microscope, but observed was no large particle except a zeolite crystal. Further, in XPS analysis, an oxygen peak attributable to iron oxide indicates about an 1 eV lower value than an oxygen (O1s) peak attributable to zeolite. Thus, provided that the iron oxide particles increase in number, a shoulder should appear on a lower energy side of the peak. However, almost no difference was observed in the peak of O1s in each sample. Thus, a very small amount of the Fe exists outside of the crystal in the form of oxides, and it is thought that almost all the Fe component is dispersed inside the crystal, having its interaction with the zeolite crystal framework.

Moreover, a part of the Fe is thought to be incorporated in the zeolite framework (E. G. Derouane, et al., J. Catal., 33, 169~175, 1974), but the total number of Al and Fe incorporated in the framework should not be larger than the number of Si. Thus, when the total number of Al and Fe exceeds 1 in Table 1, an excessive part over 1 is thought to be present outside the crystal framework. It is known that the Fe component existing outside the framework, but inside the crystal (in a pore), is present in the form of $Fe_3O_4$ or Fe or Al oxides, having an interaction with the crystal framework (E. G. Derouane, et al., J. Catal., 33. 169~175, 1974; R. L. Garten, et al., J. Catal., 18. 90~107, 1970; W. N. Delgass, et al., J. Phys.Chem., 73, 2970~2979, 1969).

The X-zeolites of the above Examples each have $Na^+$ and $K^+$ associated as a cation with $(AlO_4)^{5-}$ tetrahedral unit thereof (Na, K-type X-zeolite). Then, in order to associate $Li^+$ as a cation, an ion-exchange treatment was conducted. In the ion-exchange treatment, an ion-exchange solution was used, which had been adjusted to a pH of 9.0 by adding a small quantity of lithium hydroxide solution to a 2 N lithium nitrate aqueous solution. The ion-exchange treatment was repeated 3 to 14 times, wherein 125 g of the above ion-exchange solution was added to 2.0 g of Na and/or K-type X-zeolite, and then left standing at 100° C. or alternatively stirred for 1 hour.

Table 5 below shows bulk composition ratios and surface composition ratios of respective elements in the above ion-exchanged zeolites (Li type X-zeolite), based on Si being represented as 1. The bulk composition ratios for Si, Al and Fe were measured by emission spectral analysis by use of an inductively coupled plasma (ICP), the bulk composition ratios for Na and K were measured by atomic absorption (AA), and the surface composition ratios were measured by X-ray photoelectron spectroscopy (XPS).

TABLE 5

|  |  | Examples | | | | | |
| --- | --- | --- | --- | --- | --- | --- | --- |
|  |  | 1 | 2 | 3 | 4 | 5 | 6 |
| Fe content (%) |  | 2 | 5 | 10 | 10 | 20 | 20 |
| Bulk | Si | 1.000 | 1.000 | 1.000 | 1.000 | 1.000 | 1.000 |
| formulation | Al | 0.975 | 0.958 | 1.014 | 0.916 | 0.975 | 0.993 |
| (ICP, AA) | Na | trace | trace | trace | trace | trace | trace |
|  | K | trace | trace | trace | trace | trace | trace |
|  | Li | 0.743 | 0.735 | 0.767 | 0.670 | 0.807 | 0.800 |
|  | Fe | 0.019 | 0.049 | 0.102 | 0.092 | 0.220 | 0.218 |
| Surface | Si | 1.000 | 1.000 | 1.000 | 1.000 | 1.000 | 1.000 |
| Formulation | Al | 0.868 | 0.882 | 0.873 | 0.894 | 0.777 | 0.818 |
| (XPS) | Na | trace | trace | trace | trace | trace | trace |
|  | K | trace | trace | trace | trace | trace | trace |
|  | Fe | 0.081 | 0.076 | 0.163 | 0.192 | 0.246 | 0.230 |

In the case of Fe-containing zeolites of the above Examples, peaks of Li1s and Fe3p overlapped, thereby preventing a surface composition of Li from being measured.

As understood from Table 5, after Li ion-exchange, the number of Li ions decreased by about not less than 20% from the total number of ion-exchange sites. The above Li type X-zeolites each have a Li/Al ratio of from 0.73 to 0.83.

According to Tables 4 and 5, it is understood that the Fe component of the bulk composition after Li ion-exchange decreased by about 10%, and the Fe component of the surface composition decreased further. It is thought that this is because fine particles such as iron oxide existing near the surface, particularly outside the zeolite particle, were washed out by the repeated ion-exchange treatment and washing.

The adsorption performances of the nitrogen adsorbents of the Examples were reviewed.

Table 6 below shows the results of measuring a nitrogen adsorption volume and a separation factor of nitrogen and oxygen in the above Li type X-zeolite Examples. The nitrogen adsorption volume was measured at 22.1° C. under 760 Torr, and the separation factor was calculated by the above-mentioned formula (1), based on the results of adsorption isotherm measurement of nitrogen and oxygen at 22.1° C.

TABLE 6

| | Examples | | | | | | Comparative Example |
|---|---|---|---|---|---|---|---|
| | 1 | 2 | 3 | 4 | 5 | 6 | |
| Fe content (%) | 2 | 5 | 10 | 10 | 10 | 20 | 0 |
| Nitrogen adsorption (max.) [ml(STP)/g] | 26.4 | 28.0 | 27.6 | 28.7 | 17.6 | 23.3 | 31.3 |
| Separation factor (max.) | 5.97 | 6.18 | 7.01 | 6.63 | 5.46 | 6.05 | 6.62 |

The nitrogen adsorbents with a Fe content ratio of up to 10% had a nitrogen adsorption volume of 26 to 29 ml(STP)/g, and the Fe content did not exert a large effect. Where the Fe content ratio became 20% or more, the nitrogen adsorption volume decreased significantly. This agrees with the results of the surface area shown in Table 3, and it is thought to be due to degradation of the crystallinity. The separation factor was at maximum in the case of the nitrogen adsorbent having an initial Fe formulation ratio of 10% (Example 3: Li/Al=0.756, Fe/(Fe+Al)=0.091), and this factor is larger than a maximum factor (6.62) of a Li ion-exchanged nitrogen adsorbent synthesized without an addition of Fe, which was confirmed as a Comparative Example.

The above Li type X-zeolites were heated under a vacuum at a temperature of 400 to 600° C. and, for these zeolites, the nitrogen adsorption volume and the separation factor of nitrogen and oxygen were measured. The results are shown in following Table 7. The nitrogen adsorption volume was measured at 22.1° C. under 760 Torr, and the separation factor was calculated by the above-mentioned formula (1), based on the results of adsorption isotherm measurement at 22.1° C.

TABLE 7

| | Examples | | |
|---|---|---|---|
| | 7 | 8 | 9 |
| Treatment temp. (° C.) | 400 | 500 | 600 |
| Nitrogen adsorption (max.) [ml(STP)/g] | 18.7 | 24.1 | 20.0 |
| Separation factor (max.) | 5.15 | 6.59 | 6.12 |

For the Examples 7 to 9 in the above Table 7, synthesized LSXs containing 10% of Fe were used. They were ion-exchanged three times with Li by the above-mentioned method, and each heated under a vacuum for 2 hours at 400, 500 and 600° C., respectively. Before measuring the adsorption volume, all were heated under a vacuum at 400° C. to remove adsorbed water. In order to exchange $Na^+$ and $K^+$ with a designated amount of $Li^+$ by the above ion-exchange treatment, it was necessary to conduct the treatment about more than 5 times. After three ion-exchange treatments, $Na^+$ remained to such a degree that the Na/Al ratio was about 0.07, and the Li/Al ratio was about 0.8. Even in such a condition, the adsorbent heated under a vacuum at 500° C. had both a nitrogen adsorption volume and a separation factor largely increased as compared with those adsorbents heated at 400° C. When heated at 600° C., both the volume and factor were lower than those of the adsorbent heated at 500° C., but were improved over those adsorbents heated at 400° C. This may be, as mentioned in some of the literature, because a strong interaction between the Fe component and the zeolite framework develops, the Fe component existing inside a pore of the zeolite may be incorporated into the zeolite framework by heating under a vacuum (R. L. Garten, et al., J. Catal., 18. 90~107,; B. D. McNicol, et al., J. Catal., 25, 223 229, 1972; E. G. Derouane, et al., J. Catal., 33. 169~175, 1974).

The nitrogen adsorbent of the present invention was examined with respect to heat resistance.

When the Fe-containing X-zeolite synthesized by the present invention was compared by thermogravimetric analysis (TG-DTA) with Li ion-exchanged zeolite (Li-LSX: $SiO_2/Al_2O_3$ ratio=2.0) synthesized without adding Fe, two endothermic peaks in both cases appeared in the range of 800 to 900° C., and were located in the same positions. Therefore, it is believed that the temperature at which the zeolite framework is completely destroyed is almost the same in both cases.

However, a practical treatment in most cases such as for regeneration of the zeolite is conducted at a temperature much lower than 800° C. for a long period. Thus, the Fe-containing X-zeolite was calcined at 650° C. for 2 hours, and then reviewed with respect to heat resistance by studying changes in the surface area. As a Comparative Example, LSX ($SiO_2/Al_2O_3$ ratio=2.0) synthesized without containing Fe was reviewed in the same way. The results are shown in Table 8.

TABLE 8

| | | Examples | | | | | Comparative Example |
|---|---|---|---|---|---|---|---|
| | | 1 | 3 | 4 | 5 | 6 | |
| Fe content (%) | | 2 | 10 | 10 | 20 | 20 | 0 |
| Surface Area ($m^2/g$) | Before calcining | 724 | 702 | 685 | 591 | 639 | 704 |
| | After calcining | 524 | 439 | 357 | 204 | 223 | 248 |

As understood from Table 8, the Comparative Example, after calcining, had a surface area of about 250 $m^2/g$. In contrast, the Examples, except Examples 5 and 6 having a 20% Fe content, had a surface area of not less than 350 $m^2/g$. Example 1 with a 5% Fe content, even after calcining, had a surface area of not less than 520 $m^2/g$, and exhibited the best heat resistance. Even prior to calcining, the Examples having a 20% Fe content inherently had a smaller surface area and a poorer crystallinity, so that the heat resistance was not as good.

INDUSTRIAL APPLICABILITY

As described hereinbefore, the nitrogen adsorbent of the present invention maintains the number of cation sites contributing to adsorption, and has an excellent nitrogen adsorption performance, or equivalently, an excellent separation performance of nitrogen and oxygen and an improved heat resistance. Particularly, the zeolite containing Fe as a trivalent element, in terms of adsorption volume of nitrogen and oxygen, adsorbs much less oxygen than nitrogen. With such a property, during nitrogen-oxygen separation in a PSA method, it is found that an excellent separation performance is exhibited and an oxygen generation ratio is extremely high. Further, although some materials have an excellent performance only in nitrogen adsorption, the nitrogen adsorption of the present invention has an excellent separation factor, and, so far, there is no other material exhibiting such an excellent performance. Thus, with the zeolite having a high separation factor, the efficiency unit in a PSA method (amount of electricity per one unit of oxygen generation volume) can be remarkably improved and oxygen can be generated by less energy in comparison with a conventional adsorbent.

In accordance with the present invention, when the cation is $Li^+$, an excellent nitrogen adsorption performance is exhibited. In other words, among cations contributing to adsorption, $Li^+$ has an ion radius of 0.60 Å, which is the smallest among alkali metals. Therefore, $Li^+$ has the highest charge density and a strong interaction with a polar substance thereby to attract cations and to create an electrostatic field by its bonding balance. Such electrostatic field attracts and selectively adsorbs a molecule with a polar moment such as nitrogen, thus exhibiting an excellent nitrogen adsorption performance.

Moreover, when the nitrogen adsorbent of the present invention has not less than 60% to less than 88% of its $(AlO_4)^{5-}$ tetrahedral units associated with $Li^+$ cations, a good adsorption performance is obtained even at a relatively lower $Li^+$ cation association ratio, thereby decreasing production costs.

Furthermore, an adsorption performance is improved by heating under a vacuum the adsorbent recited in Claim 1 and then adsorbing nitrogen. The temperature for heating under a vacuum is from not less than 400° C. to not greater than 600° C. Where the process of heating under a vacuum is repeated several times, adsorption performance is gradually improved.

What is claimed is:

1. A method for adsorbing nitrogen from a nitrogen-containing material with a nitrogen adsorbent, the method comprising heating the nitrogen adsorbent under a vacuum for developing a strong interaction between at least one trivalent element and a zeolite framework, heating the nitrogen adsorbent to remove adsorbed water, and contacting the nitrogen containing material with the nitrogen adsorbent, the nitrogen adsorbent comprising a crystalline X zeolite having a faujasite structure with an $SiO_2/Al_2O_3$ ratio of less than 3.0, the crystal in which a part of the framework is replaced by the at least one trivalent element selected from the group consisting of Fe, B and Ga and $(AlO_4)^{5-}$ tetrahedral units containing the at least one trivalent element associated with cations.

2. The method of using the nitrogen adsorbent according to claim 1, wherein the heating of the nitrogen adsorbent is conducted under a vacuum at a temperature of from not less than 400° C. to not greater than 600° C. for developing a strong interaction between the at least one trivalent element and the zeolite framework.

3. A nitrogen adsorbent comprising a crystalline X zeolite having a faujasite structure with an $SiO_2/Al_2O_3$ ratio of less than 3.0, wherein a part of a framework of the crystal is replaced by at least one trivalent element selected from the group consisting of Fe, B and Ga and $(AlO_4)^{5-}$ tetrahedral units containing the at least one trivalent element associated with cations.

4. The nitrogen adsorbent according to claim 3, wherein less than 60% to less than 88% of the $(AlO_4)^{5-}$ tetrahedral units containing the at not least one trivalent element are associated with $Li^+$ cations.

* * * * *

UNITED STATES PATENT AND TRADEMARK OFFICE
CERTIFICATE OF CORRECTION

PATENT NO.    : 6,423,121 B1
DATED         : July 23, 2002
INVENTOR(S)   : Kiyama et al.

It is certified that error appears in the above-identified patent and that said Letters Patent is hereby corrected as shown below:

Title page,
Item [73], change "Daido Hoxan Inc., Sapporo (JP)" to be
-- Air Water Inc., Sapporo (JP) --

Column 12,
Lines 35 and 36, change, "wherein less" to be -- wherein not less --
Line 37, change, "at not least" to be -- at least --

Signed and Sealed this

Eleventh Day of February, 2003

JAMES E. ROGAN
*Director of the United States Patent and Trademark Office*